United States Patent [19]

Cassat et al.

[11] 4,316,002

[45] Feb. 16, 1982

[54] MOLDING COMPOSITIONS COMPRISED OF POLYIMIDE/N-VINYLPYRROLIDONE PREPOLYMER AND EPOXY RESIN

[75] Inventors: Robert Cassat, Ternay; Gerard Guillot, Tassin La Demi-Lune, both of France

[73] Assignee: Rhone-Poulenc Industries, Paris, France

[21] Appl. No.: 87,650

[22] Filed: Oct. 23, 1979

[30] Foreign Application Priority Data

Oct. 25, 1978 [FR] France ............................ 78 30276

[51] Int. Cl.³ .................... C08G 59/08; C08G 59/06; C08G 73/12
[52] U.S. Cl. .............................. 528/107; 260/37 N; 260/37 EP; 260/40 R; 428/413; 428/473.5; 428/480; 525/113; 525/117; 525/422; 528/117; 528/159; 528/163; 528/289; 528/297; 528/306; 528/322

[58] Field of Search ............... 528/322, 117, 107, 159, 528/163; 525/422, 113, 117

[56] References Cited

U.S. PATENT DOCUMENTS 4,005,154  1/1977  Bargain .............................. 528/117
4,035,345  7/1977  Ducloux ............................. 528/322

OTHER PUBLICATIONS

The Naming and Indexing of Chemical Compounds from Chemical Abstracts, Introduction to the Subject Index of vol. 56, 1962, p. 49n.

*Primary Examiner*—Harold D. Anderson
*Attorney, Agent, or Firm*—Burns, Doane, Swecker & Mathis

[57] ABSTRACT

Novel thermosetting compositions, including a polyimide/N-vinylpyrrolidone prepolymer, optionally comprising an unsaturated polyester, and an epoxy resin, are well adapted for the molding of a variety of useful shaped articles.

12 Claims, No Drawings

MOLDING COMPOSITIONS COMPRISED OF POLYIMIDE/N-VINYLPYRROLIDONE PREPOLYMER AND EPOXY RESIN

BACKGROUND OF THE INVENTION

1. Field of the Invention

The present invention relates to novel thermosetting compositions comprising certain imido prepolymers and an epoxy resin.

2. Description of the Prior Art

Thermosetting compositions comprising a bis-maleimide and N-vinyl-2-pyrrolidone are already known to this art; Belgian Pat. No. 846,365 (U.S. Pat. No. 4,111,919). Such compositions may be used in the prepolymer state for molding operations, either by casting or impregnation. Further, improvements in the properties of epoxy resins too are known to have been sought, by combining same with the derivatives of a polyimide of an unsaturated carboxylic acid. Compare the compositions described in, for example, French Pat. Nos. 2,045,087 and 2,076,447. The 2,045,087 French patent has for a major object the hardening or curing of epoxy resins by means of a prepolymer obtained by heating a bis-imide and a polyamine. The 2,076,447 French patent mentions the combination of an epoxy resin, a bis-imide and a carboxylic acid anhydride which, after hardening, yields materials having increased mechanical properties.

However, for certain applications it would be useful to provide compositions simultaneously having good stability at ambient temperature, greater fluidity at low temperatures than the imide prepolymers and adapted for the ultimate preparation of materials having excellent mechanical properties.

SUMMARY OF THE INVENTION

Accordingly, a major object of the present invention is the provision of such stable, more fluid and stronger compositions, the same comprising:

[i] a prepolymer obtained by reacting:

(a) a polyimide having the structural formula:

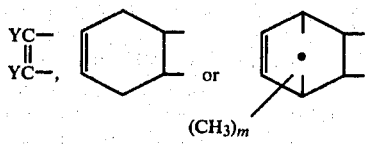

wherein D represents

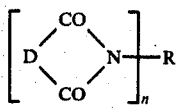

wherein Y represents H, $CH_3$ or Cl and m is equal to 0, 1 or 2, R represents an organic radical of valence n, containing from 2 to 50 carbon atoms, and n represents a number having an average value between 2 and 5; with (b) N-vinyl-2-pyrrolidone; and
(c) optionally, with an unsaturated polyester;
[ii] an epoxy resin; and,
[iii] a hardener or curing catalyst for the epoxy resin.

DETAILED DESCRIPTION OF THE INVENTION

More particularly, according to the invention, the polyimide preferably is a bis-imide having the structural formula:

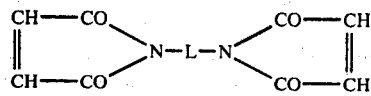

wherein the symbol L represents a divalent radical selected from the group comprising cyclohexylene, phenylene radials and radicals having the structural formula;

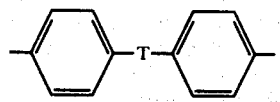

wherein T represents $-CH_2-$, $-C(CH_3)_2-$, $-O-$ or $SO_2$.

Among the bis-maleimides corresponding to the formulae and definitions given hereinabove, most preferred is N,N',4,4'-diphenylmethane-bis-maleimide.

The polymides (a) are known to the art. Same may be prepared by the methods disclosed in U.S. Pat. No. 3,018,290 and British specification No. 1,137,592.

The polyimide and the N-vinyl-2-pyrrolidone-2 are employed in quantities such that, if $n_1$ designates the number of carbon-carbon double bonds introduced by the polyimide and $n_2$ the number of $-CH=CH_2$ groups contributed by the N-vinyl-2-pyrrolidone, the ratio of $n_1/n_2$ is between 1.01 and 10.

The unsaturated polyesters that are optionally co-reacted are themselves well known to the art. Same are typically prepared by polycondensation of at least one polycarboxylic acid or ester-forming derivatives thereof (hereafter the "polycarboxylic derivatives") and at least one polyol, at least one of which contains olefinic unsaturation; the term "polycarboxylic derivatives" is to be understood as connoting the free acids, the esters of lower alcohols, the acid chlorides and possibly the anhydrides. In the compositions according to the invention, most suitable are the polyesters prepared from starting unsaturated monomers of diacid or dianhydride type having an α, β-site of olefinic unsaturation.

Exemplary of such dicarboxylic derivatives are the maleic, chloromaleic, itaconic, citraconic, aconitic, pyrocinchonic, fumaric, chlorendic, endomethylenetetrahydrophthalic, tetrahydrophthalic, ethylmaleic, succinic, sebacic, phthalic, isophthalic, adipic and hexahydrophthalic. Among the polyols, the most common are ethylene glycol, propylene glycol, diethylene glycol, triethylene glycol, neopentyl glycol, tetraethylene glycol, butylene glycol, dipropylene glycol, glycerol, trimethylol propane, pentaerthrytol, sorbitol, bis(hydroxymethyl)-3,3-cyclohexane, tris(β-hydroxymethyl) isoycanurate.

The preparation of the unsaturated polyesters may be effected utilizing known methods (see, for example, Kirk Othmer, *Encyclopedia of Chemical Technology*, 2nd edition, Vol. 20). The molecular weight of such conventional polyesters is typically between 1000 and 10,000.

The expression "unsaturated polyester" as utilized herein is intended to connote both the aforedescribed polycondensates and solutions of said polycondensates in polymerizable olefinically unsaturated, monomers. The polymerizable liquid monomers may be, for example, hydrocarbons (styrene, vinyl toluene, divinyl benzene), ethers (vinyl oxide and chloro-2-ethyl oxide), derivatives of acrylic acid or methacrylic acid, and allyl derivatives.

The N-vinylpyrrolidone is itself a known monomer solvent for the unsaturated polyesters. It should, therefore, be understood that, if an unsaturated polyester is used, it may naturally be in the form of a solution in a polymerizable monomer, in view of the fact that the polymers according to the invention must always be prepared from N-vinylpyrrolidone. When used, the polymerizable monomer may comprise from 10 to 60% by weight of the solution of the unsaturated polyester. In the compositions according to the invention, the weight of the polyester or of the aforedefined solution preferably comprises from 5 to 60% of the total weight of the combination of polyimide+N-vinylpyrrolidone. The preparation of the prepolymers from the polyimide, N-vinylpyrrolidone and, optionally, the unsaturated polyester, is described in Belgian Pat. No. 846,365.

The prepolymer [i] defined hereinabove preferably has a softening point between 30° and 150° C.

The second component [ii] of the compositions according to the invention is an epoxy resin. The expression "epoxy resin" is intended herein in its conventional sense, i.e., as reflecting a molecule comprising a plurality of

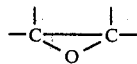

groups, each susceptible to cross-linking. All of the typical epoxy resins are intended. Among same, the following are representative: glycidyl ethers obtained by reacting, in known manner, epichlorohydrin with polyols such as gycerol, trimethylolpropane, butanediol or pentaerythritol. Other suitable epoxy resins are the glycidyl ethers of phenols, such as bis(4-hydroxyphenyl)-2,2-propane, bis(hydroxyphenyl)methane, resorcinol, hydroquinone, pyrocatechol, phloroglucinol, 4,4'-dihydroxydiphenyl, and the condensation products of phenol/aldehyde type. It is also envisaged to utilize the products of the reaction of epichlorohydrin with primary or secondary amines such as bis(4-methylaminophenyl)methane or bis(4-aminophenyl)sulfone, together with aliphatic or alicyclic polyepoxides prepared by epoxidation, by means of peracids or hydroperoxides, of the corresponding unsaturated species. These different types of resins are well described in the literature and for their preparation, see, for example, the work of Houben-Weil, Vol. 14/2, page 462.

Particularly suitable epoxy resins are the glycidylethers of poly(hydroxyphenyl) alkanes or phenol-formaldehyde resins.

The proportions of the components (i) and (ii) in the subject compositions may vary over wide limits as a function of the ultimate properties desired in each particular case. Thus, the weight of the prepolymer (i) may range from 5 to 95%, and advantageously from 20 to 80%, of the overall mixture (prepolymer+epoxy rein).

The compositions according to the invention are prepared by simply intimately admixing the several components. The mixture of the resin and the prepolymer is heated to a temperature on the order of 50°-120° C. until a homogeneous intimate admixture is obtained. The compositions may then be hardened, or cured, at a temperature on the order of 120° C. to 280° C., and preferably from 150° C. to 200° C.

Suitable hardening or curing agents (iii), whether added at the time of formulation of the components (i) and (ii), or subsequently added thereto at the time of intended use, are the conventional acid or basic hardeners of the type typically employed for the curing of the epoxy resins, such as Lewis bases, aliphatic or aromatic primary, secondary and tertiary amines, Lewis acids, carboxylic acid anhydrides, and the like.

In a preferred embodiment of the invention, the prepolymer may be prepared in situ by heating a mixture of the epoxy resin, the bis-imide and the N-vinyl-2-pyrrolidone, optionally including the unsaturated polyester, at a temperature within the range of 50°-130° C.

The composition of the invention are useful for both molding and impregnation operations. Same may be employed for the production of coatings, adhesive bonding, foams, laminations and reinforced composite materials. The reinforcing material may be in the form of powders, corrugated or non-corrugated sheets, unidirectional elements or cut natural or synthetic fibers, such as glass filaments and fibers, boron fibers and filaments, carbon, tungsten, silicon fibers, or fibers of aromatic polyamide-imides or polyamides. The compositions are of particular interest for the production of intermediate articles pre-impregnated without solvent. The impregnation of fibrous substrates may be effected utilizing conventional techniques, such as immersion or transfer impregnation. The transferable film and the pre-impregnated articles may be directly used, or same may be stored for later use; they retain their properties to a remarkable degree during storage at ambient temperature. Composite materials resulting from molding and hardening have favorable mechanical properties, particularly concerning bending strengths and shear strengths at elevated temperatures. Because of these properties, the compositions according to the invention are particularly suitable for the manufacture of parts for the aeronautical industry.

In order to further illustrate the present invention and the advantages thereof, the following specific examples are given, it being understood that same are intended only as illustrative and in nowise limitative.

EXAMPLE 1

A prepolymer was prepared by mixing, at 120° C., 75 parts (by weight) of N,N',4,4'-diphenylmethane bis-maleimide, 12.5 parts of N-vinyl-2-pyrrolidone and 12.5 parts of a solution comprising 40% by weight of allyl phthalate and 60% of an unsaturated polyester having a molecular weight of 2000, obtained by polycondensation of maleic acid, propylene glycol and ethylene glycol. The mixture was placed for 30 minutes in an oven heated to 140° C. to obtain a product having a softening point of 70° C.

The following ingredients were mixed at 90° C.:

(a) 100 g epoxy resin of bisphenol A, commercially available under the trademark "Cy 205";

(b) 100 g of the prepolymer prepared as described hereinabove.

Three grams of a BF₃/amine (HT 973) hardener were then added thereto.

The homogeneous admixture was degassed under vacuum at 90° C. The time of gelification at 180° C. was 8 minutes.

A laminate was prepared utilizing the aforedescribed composition. The composition was deposited by coating with a coating blade, at a rate of 200 g/m², on silicone coated paper. The film had good adhesion at ambient temperature and displayed no voids. This film was used to impregnate a sheet of unidirectional carbon fibers (AXT 10,000 of SEROFIM) at a temperature of 70° C. under a pressure of 0.5 bar for 30 seconds. The air retained by the carbon fibers was then eliminated by passing the sheet under vacuum at 70° C. for 15 minutes. 10 plies of this pre-impregnated graphite sheet were placed in a mold preheated to 80° C. The mold was progressively closed to expel the excess resin, with the pressure attaining 5 bars at the completion of closing. The cross-linkable laminate contained 100 g resin per 100 g of the fibers. The assembly was then exposed to a heat treatment for 1 hour at 140° C. and 5 hours at 200° C. The properties of the composite materials were as follows:

| | |
|---|---|
| [1] Density | 1.53 |
| [2] Flexural strength (ASTM Standard D 790) | |
| at 20° C. | 130 kg/mm² |
| [3] Flexural modulus (ASTM D Standard 790) | |
| at 20° C. | 9100 kg/mm² |
| [4] Shear strength | |
| at 20° C. | 6.7 kg/mm² |
| at 150° C. | 4 kg/mm² |

(shear tests were effected with a distance between supports of 10 mm, a test velocity of 1 mm per minute with 12×2 mm specimens.

EXAMPLE 2

A composite material was prepared by the method described in Example 1.

The following composition was utilized:

| | |
|---|---|
| (a) Novolac epoxy resin (DEN 431) | 58 g |
| (b) Prepolymer (Example 1) | 42 g |
| (c) Hardener HT 973 | 1.5 g |

The gelification time of this composition was 24 minutes at 150° C. The carbon fibers were impregnated by film transfer and a laminate was formed by folding 10 piles of the pre-impregnated sheet into a cold mold. The assembly was heated to 130° C. The mold was then closed, the pressure progressively rising from 0.2 to 5 bars at the completion of the closure. The laminate contained 60% resin by volume. The assembly was then heated for one hour at 150° C., 3 hours at 180° C. and 20 hours at 200° C. The properties of the composite material were as follows:

| | |
|---|---|
| [1] flexural strength (kg/mm²) | |
| at 20° C. | 143 |
| [2] flexural strength | |
| at 120° C. | 120 |
| [3] flexural modulus (kg/mm²): | |
| at 20° C. | 10 350 |
| at 120° C. | 9 700 |
| [4] Shear strength (kg/mm²): | |
| at 20° C. | 8 |
| at 180° C. | 3.4 |

EXAMPLE 3

Into a reactor equipped with an agitator and placed into a 110° C. thermostat bath, 10 g of the prepolymer described in Example 1 and 90 g of an epoxy resin consisting of a polyglycidyl ether of a phenol-formaldehyde novolac having a weight in epoxy equivalents of approximately 175. The mixture was melted and agitated for a few minutes until a homogeneous solution was obtained. Subsequently, 2.7 g of a BF₃/amine hardener were added. The mixture was agitated for 5 minutes and degassed by placing the reactor under vacuum for 2 minutes. The resin was poured into a rectangular mold (120×200×13 mm). The assembly was heated for 2 hours at 110° C. and then for 20 hours at 200° C.

The properties of the molded shaped article are compiled in Table 1. The initial flexural strength (Rf) and the initial flexural modulus (Mf) were determined at 20° C. and at 120° C.

EXAMPLE 4

The operation described in Example 3 was repeated, but by using a mixture of 90 g of the same imide prepolymer, 10 g of the same epoxy resin and 0.35 g of the hardener. The molded shaped article was cured for 2 hours at 150° C. and then for 20 hours at 200° C.

The properties of the molded shaped article are compiled in Table 1.

EXAMPLE 5

The operation described in Example 3 was repeated by using 42 g of the same imide prepolymer, 58 g of the same epoxy resin and 1.75 g of the hardener.

The properties of the molded shaped article prepared under the conditions described in Example 4 are compiled in Table 1.

EXAMPLE 6

A prepolymer was prepared by mixing, at 120° C., 80 parts (by weight) of N-N',4,4'-diphenylmethane bismaleimide and 20 parts of N-vinyl-2-pyrrolidone. Following agitation for 30 minutes at this temperature, a prepolymer, having a viscosity in the molten state of 200 mPa.s at 110° C., was obtained.

Example 3 was repeated by using 10 g of the prepolymer thus prepared and 90 g of the same epoxy novolac resin; then, after homogenization, 2.7 of the BF₃/amine hardener, were added.

The properties of the molded shaped article prepared under the conditions described in Example 3 are compiled in Table 1.

TABLE 1

| Properties | Ex. 3 | Ex. 4 | Ex. 5 | Ex. 6 | Ex. 7 |
|---|---|---|---|---|---|
| Rf (kg/mm²) | | | | | |
| — at 20° C. | 8.5 | 7.5 | 9.6 | 8.4 | 8.8 |
| — at 120° C. | 5.7 | 5.3 | 6.8 | 6 | 6 |
| Mf (kg/mm²) | | | | | |
| — at 20° C. | 289 | 407 | 338 | 310 | 350 |
| — at 120° C. | 175 | 225 | 180 | 170 | 218 |

While the invention has been described in terms of various preferred embodiments, the skilled artisan will appreciate that various modifications, substitutions, ommission, and changes may be made without departing from the spirit thereof. Accordingly, it is intended that the scope of the present invention be limited solely by the scope of the following claims.

What is claimed is:

1. A composition of matter comprising (i) a prepolymer consisting essentially of a reaction product obtained by reacting (a) a polyimide having the structural formula:

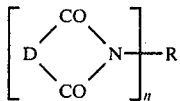

wherein D is selected from the group consisting of

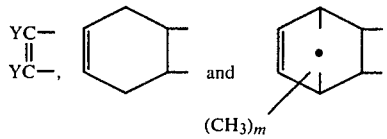

wherein Y is selected from the group consisting of H, $CH_3$, and Cl, m is 0, 1 or 2, R is an organic radical of valency n, containing from 2 to 50 carbon atoms, and n is a number having an average value between 2 and 5, and (b) N-vinyl-2-pyrrolidone; and (ii) an epoxy resin having at least one 1,2 epoxy group.

2. The composition of matter as defined by claim 1, further comprising (iii) a hardening agent for the epoxy resin.

3. The composition of matter as defined by claim 2, wherein the prepolymer (i) comprises from 5 to 95% by weight of the total amount of prepolymer (i) and epoxy resin (ii).

4. The composition of matter as defined by claim 3, wherein the prepolymer (i) comprises from 20 to 80% by weight of the total amount of prepolymer (i) and epoxy resin (ii).

5. The composition of matter as defined by claim 3, wherein the polyimide (a) has the structural formula:

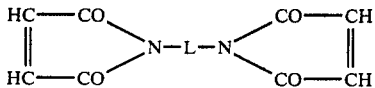

wherein L is a divalent radical selected from the group consisting of cyclohexylene, phenylene and radicals having the structural formula:

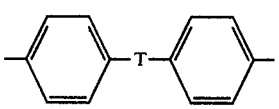

wherein T is selected from the group consisting of $-CH_2-$, $-C(CH_3)_2-$, $-O-$ and $-SO_2-$.

6. The composition of matter as defined by claim 5, wherein the polyimide (a) is N,N',4,4'-diphenylmethane-bis-maleimide.

7. The composition of matter as defined by claim 5, further comprising a reinforcing amount of a filler.

8. The composition of matter as defined by claim 5, wherein the epoxy resin (ii) is the glycidyl ethers of a poly(hydroxyphenyl)alkane or phenol- formaldehyde resin.

9. The composition of matter as defined by claim 2, wherein said composition is in a hardened state.

10. A shaped article comprising the composition of matter as defined by claim 2.

11. A shaped article comprising the composition of matter as defined by claim 9.

12. The composition of matter as defined by claim 2 wherein said hardening agent comprises $BF_3$.

* * * * *